UNITED STATES PATENT OFFICE.

G. C. G. SAUR, OF WASHINGTON, DISTRICT OF COLUMBIA.

IMPROVED HAIR-DYE.

Specification forming part of Letters Patent No. 35,840, dated July 8, 1862.

*To all whom it may concern:*

Be it known that I, G. C. G. SAUR, of Washington, in the District of Columbia, have invented certain new and useful Compounds or Preparations for Dying Hair Black or Brown; and I do hereby declare that the following is a full, clear, and exact description of the same.

The nature of my invention consists in first applying to the hair a wash composed of water, alcohol, and gallic acid, which prepares it for the effective chemical action of the second compound, consisting of nitrate of silver, gum-arabic, spirits of ammonia, and distilled water.

To enable others skilled in the art to make and use my invention, I will proceed to describe its composition and operation.

I prepare a wash or liquid composed of two drams of gallic acid, two ounces of alcohol, and one pint of soft water. This, which I will call "No. 1," I apply to the hair with a sponge, completely saturating it therewith, and rubbing it well into the roots. I then wipe the hair quite dry with a clean towel, and apply with a small brush—a tooth-brush will do—a solution compounded of one ounce of nitrate of silver, once ounce of gum-arabic, one ounce of spirits of ammonia, and one pint of distilled water. This immediately colors the hair, when it is to be well washed with soap and water, and the process is completed, and a beautiful black the result. If it be desirable to produce a good brown color, this may be effected by adding one-half pint more of distilled water to the solution No. 2.

Having thus described my invention and pointed out its mode of application, what I claim therein, and desire to secure by Letters Patent of the United States, is—

The wash No. 1 and solution No. 2 when compounded and applied substantially as and for the purpose described.

G. C. G. SAUR.

Witnesses:
 EDM. F. BROWN,
 HARRY W. PRICE.